Aug. 22, 1967  M. GORDON  3,337,178

SELF-SEALING SLIDE GATE VALVE

Filed Nov. 4, 1964  2 Sheets-Sheet 1

INVENTOR
MACK GORDON
BY
Meyer, Baldwin, Doran & Egan
ATTORNEYS

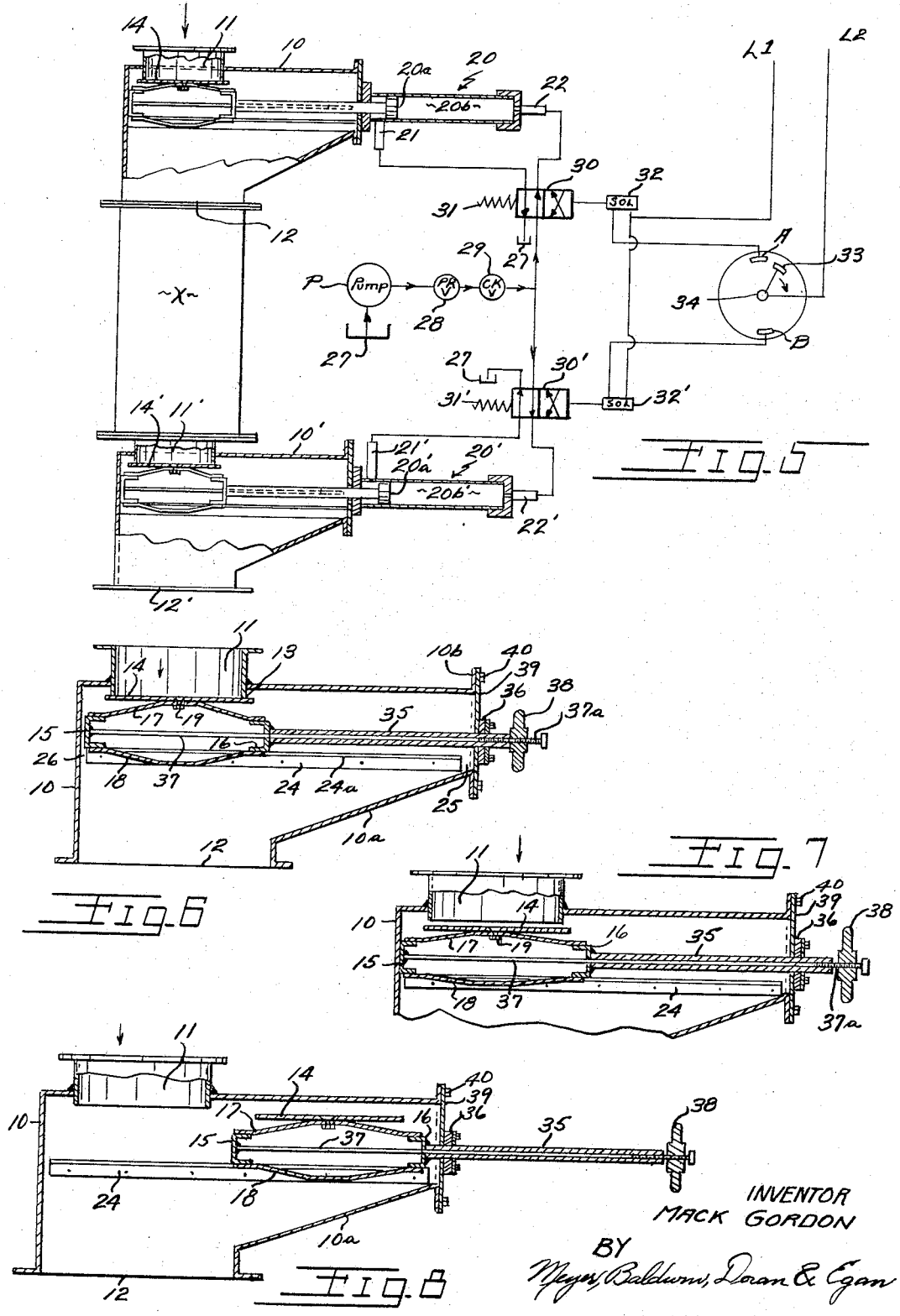

3,337,178
SELF-SEALING SLIDE GATE VALVE
Mack Gordon, 12727 Buckeye Road,
Cleveland, Ohio 44120
Filed Nov. 4, 1964, Ser. No. 408,896
4 Claims. (Cl. 251—56)

This invention relates to improvements in a self-sealing, self-cleaning and non-jamming valve resembling a slide gate valve.

One of the objects of the present invention is to provide a valve member which is positively closed by movement toward and away from its valve seat by changing the convexity of leaf springs forming part of the supporting means for the valve member.

Another object of the present invention is to provide a valve particularly suitable for closing a dust collector hopper or for controlling the bin discharge of relatively finely divided dry particulate matter.

Still another object of the invention is to provide a valve generally of the slide gate type which, when open, is quickly moved from a position in registration with the controlled opening or out of registration to permit a free flow of finely divided dry material.

Other objects and advantages of this invention will be apparent from the accompanying drawings and description and the essential features will be set forth in the appended claims.

In the drawings:

FIG. 5 is a somewhat diagrammatic view showing two of the devices of FIG. 1 connected in tandem by a material conduit and with an automatic control for operating the cylinder and piston motors of the two valves in a predetermined sequence;

FIG. 6 is a sectional view through a valve similar to that shown in FIG. 3 but equipped with manual means for causing opening and closing of the valve, the valve being shown in full lines in closed position;

FIG. 7 is a fragmental sectional view similar to FIG. 6 and showing the valve in open position and in registration with its valve seat; while FIG. 8 is a view similar to FIG. 7 but showing the valve open and out of registration with its associated seat.

Figure 1:
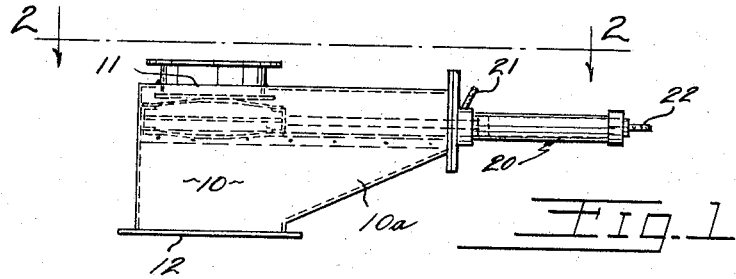
FIG. 1 is a side elvational view of the valve of this invention provided with a cylinder and piston motor for the manipulation thereof.

Referring first to FIGS. 1 through 4, a housing 10 is provided having near one end an upper or inlet opening 11 and a registering lower or discharge opening 12. It should be understood that the description of this valve will be given with the flow of material in vertical direction between 11 and 12, although other uses of the valve structure will be apparent to those skilled in the art. The lower end of the generally cylindrical inlet collar 11a is provided with a planar valve seat 13. A flat plate valve member 14 is shown in closed position against the seat 13 in FIG. 1 and in full lines in FIG. 3. Valve member supporting means is provided for lowering the plate 14 vertically downwardly a small amount as shown in dot-dash lines in FIG. 3 and then the entire valve supporting member is moved toward the right in FIG. 3 to the dot-dot-dash position leaving a clear opening between 11 and 12 for vertical flow of material when the valve is open. It will be noted that the housing 10 has a lateral extension 10a providing sufficient room to move the valve member into and out of registering position with the inlet opening 11. The housing 10 is completely enclosed except for the openings 11 and 12.

Figure 3:
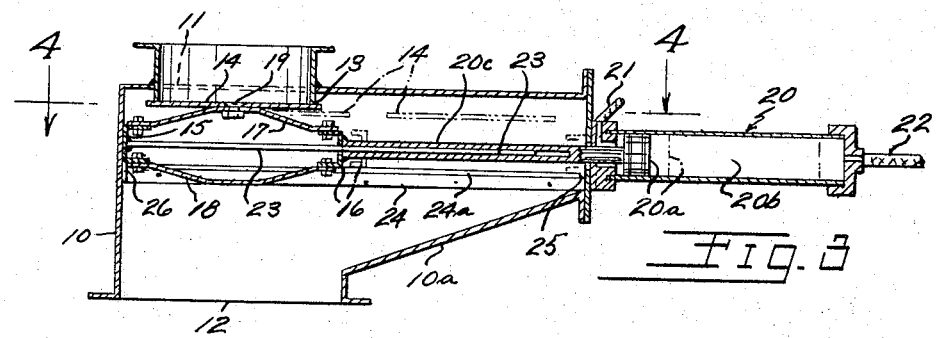
FIG. 3 is a central sectional view of the device of FIG. 2 taken along the line 3—3 thereof.

The means supporting the valve member 14 for the above described lateral movement comprises a pair of abutments 15 and 16 spaced apart in a direction parallel to the movement of the valve member 14, that is, horizontal as viewed in FIG. 3. The abutments as shown are generally channel shape mutually facing each other but other forms of abutment might be used. The abutments are connected by leaf springs 17 and 18 which are concavo-convex as shown with their ends fixed to the abutments 15 and 16 and the intermediate portion of the upper spring 17 connected by means of bolt 19 with the center of the circular disk 14 which provides the valve member. With this construction, relative movement of the abutments 15 and 16 toward and away from each other changes the convexity of the springs 17 and 18 whereby the upper spring either increases its convexity to hold the valve member 14 tightly against the annular seat 13 as shown in full lines in FIG. 3; or, when the abutment 16 is moved to the dot-dash position of FIG. 3, then the upper spring 17 is flattened somewhat so as to lower the valve member 14 to the dot-dash position shown there.

In the form of the invention shown in FIGS. 1 through 4, means is provided for manipulation of the valve taking the form of a cylinder and piston motor 20 which is preferably double acting and provided with combined inlet and outlet openings 21 and 22 at opposite ends thereof for the flow of a suitable pressure fluid to cause movement of the piston 20a back and forth in the cylinder 20b. The piston rod 20c connected with the piston 20a extends generally parallel to the direction of movement of the valve member 14 and is connected as by welding to the abutment 16. The rod 20c has a hollow axially extending opening 20d which slidably receives a rod 23 which is rigidly connected to the abutment 15.

Figure 2:
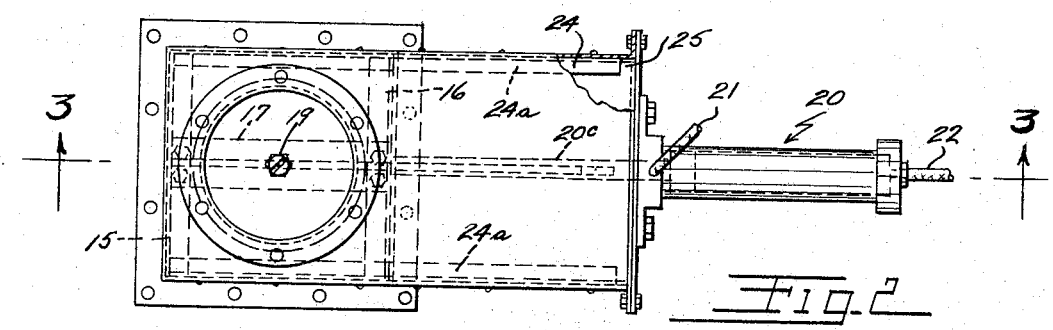
FIG. 2 is a top plan view, enlarged, showing the device of FIG. 1.
Figure 4:
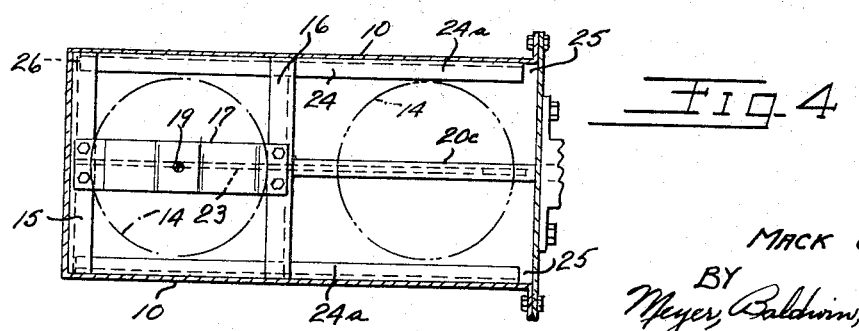
FIG. 4 is a top plan view of the left-hand portion of FIG. 3 showing in broken lines the valve member in registration and out of registration with its associated valve seat.

The operation of the embodiment shown in FIGS. 1 through 4 should now be readily understood. In the full line position of FIG. 3, pressure fluid in cylinder 20b holds the valve supporting means 15, 16, 17, 18 in the full line position shown. The reaction of the force holding springs 17 and plate 14 in the position shown is absorbed by the abutments 15 and 16 resting on parallel ways 24 which extend horizontally along opposite vertical side walls of the housing 10 as shown in FIGS. 2, 3 and 4. As clearly shown in FIGS. 2 and 4, the abutments 15 and 16 extend laterally beyond the leaf springs 17 and 18 out to the side walls where they rest upon the ways 24. These ways are L-shape with a flat horizontal top against which the abutments 15 and 16 slide and a vertical leg which is fastened to the side walls of the housing 10. Referring to FIG. 3 it will be noted that the horizontal flange 24a of the ways is cut away at the ends as indicated at 25 and 26. The purpose of this is to allow any loose dust or finely divided material which may fall upon the ways 24 while the material is passing between the openings 11 and 12 to be scraped away by the movement of abutments 15 and 16 about to be described. With the valve in the full line position of FIG. 3, the opening movement takes place by introducing pressure fluid through line 21 and discharging the same through line 22 so as to cause the piston 20a to move toward the right as viewed in FIGS. 1, 2 and 3. This will cause a first movement of abutment 16 from the full line position of FIG. 3 to the dot-dash position shown there while the piston 20a moves to the dot-dash position in FIG. 3. In this embodiment, the spring 17 normally takes a flatter position than that shown in full lines in FIG. 3 and this together with a similar action of spring 18 pushes the abutment 16 to the dot-dash position when the piston moves toward the right. This causes the plate 14 to move downwardly from its valve closed position and slightly toward the right toward the dot-dash position 14 of FIG. 3. Further movement of piston 20a under the action of fluid entering at 21 will move the same to the right-hand end of cylinder 20b thus pulling the valve supporting means including the abutments 15 and 16 toward the right so that the member 16 moves to the dot-dot-dash position of FIG. 3 while the plate 14 is carried to the dot-dot-dash position shown. It should be understood that the entire assembly 15, 16, 17, 18 moves toward the right from the full line position of FIG. 3 but only parts are shown in order not to confuse the drawing. Thus, the housing 10 becomes completely unobstructed for flow of material between openings 11 and 12. To close the valve, pressure fluid is introduced through conduit 22 and exhausted at conduit 21 to return the parts to the full line position of FIG. 3. At this time, the plate 14 cuts through any dry finely divided material falling between the openings 11 and 12 until the plate 14 is in registration with opening 11 directly beneath the valve seat 13 and the final push toward the left of the piston 20a moves the abutment 16 from the dot-dash position of FIG. 3 to the full line position thus causing approach movement of the abutments 15 and 16 and increasing the convexity of the springs 17 and 18 so that spring 17 pushes the plate 14 tightly against the valve seat 13.

In FIG. 5, two devices exactly like that just described are connected together with a closed passageway X connecting the discharge opening 12 of the upper housing 10 connected to the inlet opening 11' of the lower housing 10'. In this drawing, all of the parts of the upper assembly are given the reference characters shown in FIGS. 1 through 4 and similar characters are applied to the lower assembly with prime suffixes. The purpose of this assembly is to provide an air lock between the upper and lower valves so that air under pressure or under a vacuum will not escape from the upper system where the flow is downward in the direction of the arrow. FIG. 5 shows an automatic control for the pressure fluid flowing to the cylinder and piston motors 20 and 20'. A pump p is provided for pumping the pressure fluid from a reservoir 27 through suitable lines leading through a pressure regulator 28 and a check valve 29 permitting flow in the direction of the arrows only. This pressure fluid may flow upwardly in FIG. 5 through valve 30 to either end of the cylinder 20b or it may flow downwardly through valve 30' to either end of the cylinder 20b'. Each valve is normally urged toward the right by spring 31 or 31'. The valves are controlled respectively by solenoids 32 and 32' which are supplied by power through lines L1 and L2, one of which is provided with a rotating contactor 33 which is driven in timed relation by a shaft 34 from motive means not shown.

In the operation of FIG. 5, the moving contact 33 has just left the fixed contact A. While contacts 33 and A were electrically in circuit, solenoid 32 was energized moving valve 30 toward the left and causing flow of pressure fluid through conduit 21 and away from cylinder 20b through conduit 22 and back to the reservoir 27. This moved the piston and held the valve 14 open as long as contacts 33 and A were engaged. This is adjustable by the length of the contacts and the speed of movement of the shaft 34 in its rotation in the direction of the arrow. When the contact 33 leaves contact A, then the solenoid 32 is deenergized and spring 31 moves valve 30 to the position shown in FIG. 5 which causes movement of piston 20a toward the left and closes valve 14. Further travel of shaft 34 causes contact 33 to engage contact B. This energizes solenoid 32' which moves valve 30' toward the left thus moving piston 20a' toward the right and opening valve 14'. At this time valve 14 is closed and no air is lost. As soon as contact 33 leaves contact B, solenoid 32' is deenergized and spring 31' returns valve 30' toward the right to the position shown in FIG. 5, thus causing piston 20a' to move toward the left and to close valve 14'. In this fashion, valve 14 is first opened and closed and thereafter valve 14' is opened and closed so that no air pressure or vacuum can be lost other than that necessary to fill the conduit X.

In FIGS. 6, 7, and 8 I have shown a valve exactly like that shown in FIGS. 1 through 4 except that the same is hand operated instead of by means of power. All similar parts have been given similar reference characters which includes the housing 10 having the extension 10a, the inlet opening 11 and outlet opening 12, the annular valve seat 13, the flat valve member 14 sealing against seat 13, the abutments 15 and 16 traveling on the ways 24 the leaf springs 17 and 18 having their ends connected to the abutments 15 and 16 and the spring 17 connected by bolt 19 to the center of the plate 14. A hollow rod 35 having an axially extending through opening has its inner end rigidly connected to abutment 16 as by welding. Its outer end extends outside of the housing 10 and is slidable at 36 in the housing wall. A rod 37 slidable in the axial opening of hollow rod 35 has its inner end connected rigidly to the abutment 15. This rod 37 extends toward the right beyond the end of hollow rod 35 and is there provided with a thread 37a on which is threaded a hand wheel 38.

In the position of FIG. 8, the valve is open and all of the valve supporting parts are moved toward the right into the housing extension 10a so as to leave a clear passage between the inlet opening 11 and the outlet opening 12. To close the valve, the hollow rod 35 is pushed toward the left from the position of FIG. 8 to the position of FIG. 7 where the plate-like valve member 14 is in registration beneath the annular opening 13. In this embodiment, the abutment 15 strikes a wall of the housing 10 to assure the operator that all parts are in proper position. The hand wheel 38 is then rotated and bears against the right-hand end of the hollow rod 35 as shown in FIG. 6 while rotation on the threads 37a causes the rod 37 to move toward the right thus pulling the abutment 15 toward the abutment 16 and increasing the convexity of the leaf spring 17 so as to move the valve plate 14 from the dot-dash position of FIG. 6 to the full line position thereof thus tightly closing the valve. To open the valve, the parts are returned to the position of FIG. 7 by the reverse rotation of the hand wheel 38 on the threads 37a, after which the valve suporting means may be moved toward the right again returning to the position of FIG. 8.

It will be noted that the right-hand end of the housing extension 10a is closed by plate 39 which is secured to a flange 10b by means of a series of bolts 40. Thus, by removing this plate, the valve plate 14 and its supporting mechanism is easily removed out the end of the housing portion 10a for easy maintenance without removing the valve housing from the material handling system.

I have thus provided a simple valve with a few parts and positive action. Large clearances avoid jamming of the slider rod mechanism. Separate self-cleaning guides provide accurate alignment for slider rod and plate assembly travel.

What is claimed is:

1. In combination, a housing having top, bottom and side walls and closed save for there being aligned openings in said top and bottom walls at one side of said housing, the upper of said opening being provided with a planar valve seat on the lower side thereof, a flat valve adapted to close the opening of said seat, a valve actuator for causing opening and closing movement of said valve relative to said seat and having a pair of abutments spaced apart in a direction parallel to said seat and two vertically spaced concavo-convex leaf springs having their ends connected respectively to said abutments and the mid-portion of the upper of said leaf springs connected to said valve, said springs being convexly bent away from each other, ways in said housing supporting said actuator for sliding movement into and out of registering position of said valve relative to said seat, a hollow rod extending parallel to said ways and having an inner end connected to the nearer of said abutments and having an outer end extending outside of said housing, said rod slidably mounted in said housing, a pin slidable in the hollow of said rod and having an inner end connected to the farther of said abutments and having an outer end extending beyond the outer end of said rod, and means operatively connected between the outer end of said pin and the outer end of said rod and effective to hold said pin in two positions longitudinally relative to said rod, in one of which positions said abutments approach each other causing said springs to hold said valve against said seat and in the other of which positions said valve is caused to move away from said seat, in which latter position said rod may be moved longitudinally relative to said housing to move said valve into and out of registering position relative to said seat.

2. In combination, a housing having top, bottom and side walls and closed save for there being aligned openings in said top and bottom walls at one side of said housing, the upper of said openings being provided with a planar valve seat on the lower side thereof, a flat valve adapted to close the opening of said seat, a valve actuator for causing opening and closing movement of said valve relative to said seat and having a pair of abutments spaced apart in a direction parallel to said seat and two vertically spaced concavo-convex leaf springs having their ends connected respectively to said abutments and the mid-portion of the upper of said leaf springs connected to the center of said valve, ways in said housing supporting said actuator for sliding movement into and out of registering position of said valve relative to said seat, relative approach movement of said abutments when said valve is in registration with said valve seat causing closure of said valve against said seat, relative separation movement of said abutments causing opening movement of said valve away from said seat, an elongated telescoping assembly including two telescoping members extending generally parallel to said ways, one of said telescoping members connected to one of said abutments, the other of said members connected to the other of said abutments, and means operatively connected with said assembly for causing telescoping movement of said two telescoping members and causing said approach and separating movements of said abutments.

3. The combination of claim 2 wherein one of said telescoping members is a hollow rod, the other of said telescoping members is a pin having a lost-motion sliding fit in the hollow of said rod, and stop means limiting movement of said valve actuator on said ways when in registration with said valve seat, the arrangement being such that movement of said telescoping assembly against said stop means causes take-up of said lost motion and relative approach movement of said abutments.

4. The combination of claim 2 wherein one of said telescoping members in a hollow rod, the other of said telescoping members is a pin having a sliding fit in the hollow of said rod, a threaded connection between said pin and rod, and a rotatable member for causing telescoping movement between said pin and rod by manipulating said threaded connection.

References Cited

UNITED STATES PATENTS

| 287,788 | 11/1883 | Abel | 137—242 X |
| 1,134,811 | 4/1915 | Berger | 251—187 |
| 2,642,206 | 6/1953 | Reed | 222—504 X |
| 3,208,717 | 9/1965 | Palmer | 251—169 |

FOREIGN PATENTS

| 501,348 | 7/1930 | Germany. |
| 572,196 | 1/1958 | Italy. |
| 212,961 | 4/1941 | Switzerland. |

WILLIAM F. O'DEA, *Primary Examiner.*

H. W. WEAKLEY, *Assistant Examiner.*